United States Patent
Wang

(10) Patent No.: US 11,496,930 B2
(45) Date of Patent: Nov. 8, 2022

(54) METHOD FOR UPDATING PDU SESSION AND NETWORK SIDE-DEVICE

(71) Applicant: CHINA ACADEMY OF TELECOMMUNICATIONS TECHNOLOGY, Beijing (CN)

(72) Inventor: Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 29 days.

(21) Appl. No.: 16/968,443

(22) PCT Filed: Dec. 7, 2018

(86) PCT No.: PCT/CN2018/119689
§ 371 (c)(1),
(2) Date: Aug. 7, 2020

(87) PCT Pub. No.: WO2019/153863
PCT Pub. Date: Aug. 15, 2019

(65) Prior Publication Data
US 2020/0404551 A1      Dec. 24, 2020

(30) Foreign Application Priority Data
Feb. 9, 2018  (CN) .......................... 201810136176.8

(51) Int. Cl.
*H04W 36/00*     (2009.01)
*H04W 8/06*      (2009.01)
(Continued)

(52) U.S. Cl.
CPC .......... *H04W 36/0011* (2013.01); *H04W 8/06* (2013.01); *H04W 8/08* (2013.01); *H04W 36/14* (2013.01); *H04W 84/042* (2013.01)

(58) Field of Classification Search
CPC ..... H04W 36/0011; H04W 8/06; H04W 8/08; H04W 36/14; H04W 84/042; H04W 8/18; H04W 8/26; H04W 8/12; H04W 48/18; H04W 8/065; H04W 40/36; H04W 60/04; H04W 36/0033; H04W 80/10; H04L 67/141; H04L 67/148; H04L 41/0813
See application file for complete search history.

(56) References Cited

U.S. PATENT DOCUMENTS

2017/0339609 A1    11/2017  Youn et al.

OTHER PUBLICATIONS

3GPP TS 23.502 V15.0.0 (Dec. 2017);3rd Generation Partnership Project; Technical Specification Group Services and System Aspects; Procedures for the 5G System; Stage 2;(Release 15) (Year: 2017).*

(Continued)

*Primary Examiner* — Marcos L Torres
(74) *Attorney, Agent, or Firm* — Harness, Dickey & Pierce, P.L.C.

(57) ABSTRACT

A method of updating a PDU session and a network-side device are provided. The method includes: after a User Equipment UE moves across PLMNs or across systems, determining that the UE has a first PDU session of which an anchor SMF is not in a current PLMN; determining a Session Management Function V-SMF in a Visited Public Land Mobile Network VPLMN for the first PDU session, and updating the first PDN session by using the V-SMF.

18 Claims, 5 Drawing Sheets

(51) Int. Cl.
*H04W 8/08* (2009.01)
*H04W 36/14* (2009.01)
*H04W 84/04* (2009.01)

(56) References Cited

OTHER PUBLICATIONS

Extended European Search Report dated Feb. 8, 2021 for EP Application No. 18904589.1.

Ericsson, "23.501: SMF Service Areas", SA WG2 Temporary Document, SA WG2 Meeting #121, S2-173006, May 15-19, 2017 Hangzhou, China.

China Mobile, "23.502 Evaluation and Identifying SMF Services", SA WG2 Temporary Document, SA WG2 Meeting #121, S2-173028, May 15-19, 2017, Hangzhou, China.

Huawei, HiSilicon, "OI#4h: TS 23.501: Selection of a Target AMF supporting the Network Slices due to EU mobility", SA WG2 Temporary Document, SA WG2 Meeting #124, S2-178399, Nov. 27-Dec. 1, 2017, Reno, Nevada.

Ericsson, "ETSUN Solution", SA WG2 Temporary Document, SA WG2 Meeting #125, S2-180414, Jan. 22-26, 2018, Gothenburg, Sweden.

NTT Docomo, LG Electronics, Change Request, "Corrections to the Inter-system mobility procedures", 3GPP TSG-SA WG2 Meeting #125, S2-180732, Gothenburg, Sweden, Jan. 22-26, 2018.

NTT Docomo, LG Electronics, Change Request, "Corrections to the Inter-system mobility procedures", 3GPP TSG-SA WG2 Meeting #125, S2-180795, Gothenburg, Sweden, Jan. 22-26, 2018.

NTT Docomo, LG Electronics, Change Request, "Corrections to the Inter-system mobility procedures", 3GPP TSG-SA WG2 Meeting #125, S2-180802, Gothenburg, Sweden, Jan. 22-26, 2018.

Ericsson, Change Request, "Slice selection cleanup", 3GPP TSG-SA WG2 Meeting #125, S2-181157, Gothenburg, Sweden, Jan. 22-26, 2018.

Written Opinion of the International Searching Authority for International Application No. PCT/CN2018/119689 dated Feb. 27, 2019.

CATT, Change Request, "Interaction between SMF and UPF during the inter-system change", 3GPP TSG-SA WG2 Meeting #125, S2-180653, Gothenburg, Sweden, Jan. 22-26, 2018.

\* cited by examiner

METHOD FOR UPDATING PDU SESSION AND NETWORK SIDE-DEVICE

CROSS-REFERENCE TO RELATED APPLICATIONS

This application is a U.S. national phase application of a PCT Application No. PCT/CN2018/119689 filed on Dec. 7, 2018, which claims a priority to Chinese Patent Application No. 201810136176.8 filed on Feb. 9, 2018, the disclosures of which are incorporated in their entirety by reference herein.

TECHNICAL FIELD

The present disclosure relates to the field of communication technology, in particular, relates to a method of updating a PDU session and a network-side device.

BACKGROUND

In a current 5th-Generation (5G) mobile communication technology system, when a User Equipment (UE) creates a Protocol Data Unit (PDU) session by using a Home-routed manner in a Visited Public Land Mobile Network (VPLMN), an Access and Mobility Management Function (AMF) located in the VPLMN needs to select a VPLMN Session Management Function (V-SMF, i.e., a session management function in the VPLMN) located in the present PLMN for the UE, and then the PDU session to a Home Public Land Mobile Network (HPLMN) is created through the V-SMF. The AMF only needs to update a UE context to the V-SMF when the UE performs a registration update procedure in the PLMN subsequently.

However, when the UE moves across PLMNs, for example, when a VPLMN is changed or the UE moves to the HPLMN, an AMF in the new serving PLMN cannot update the V-SMF in the related art because the V-SMF is still located in the original Public Land Mobile Network (PLMN). In addition, when the UE switches from an Evolved Packet System (EPS) to a 5th-Generation System (5GS), the related art requires the AMF to select a default V-SMF for a PDU session which is a home routed PDU session. However, the default V-SMF may not be suitable for serving the PDU session.

SUMMARY

In view of the above, the present disclosure provides a method of updating a PDU session and a network-side device, so as to solve the problem in the related art that a default V-SMF selected for a PDU session which is a home routed PDU session is not suitable for serving the PDU session.

In order to solve the above technical problem, in a first aspect, the present disclosure provides a method of updating a Protocol Data Unit (PDU) session. The method is applied to a network-side device, wherein the method includes: after a User Equipment (UE) moves across Public Land Mobile Networks (PLMN) or across systems, determining that the UE has a first PDU session of which an anchor SMF is not in a current PLMN; determining a Session Management Function V-SMF in a Visited Public Land Mobile Network (VPLMN) for the first PDU session, and updating the first PDN session by using the V-SMF.

Optionally, the method further includes determining that the UE has a second PDU session of which the SMF is in the current PLMN, updating the second PDU session.

Optionally, the method further includes: receiving a registration request of the UE, wherein the registration request carries temporary identifier information of the UE; and judging, according to the temporary identifier information, whether the UE moves across PLMNs or across systems; wherein the temporary identifier information is a Global Unique Temporary Identifier (GUTI) of the UE.

Optionally, judging, according to the temporary identifier information, whether the UE moves across PLMNs or across systems includes: when the GUTI is a 5G GUTI and a mobile country code (MCC) and a mobile network code (MNC) in the GUT1 are different from those in the current PLMN, determining that the UE moves across PLMNs.

Optionally, judging, according to the temporary identifier information, whether the UE moves across PLMNs or across systems includes: when the GUTI is a Mapped 5G GUTI, determining that the UE moves across systems.

Optionally, determining that the UE has the first PDU session of which the anchor SMF is not in the current PLMN, includes: obtaining an identifier or address of the anchor SMF of the first PDU session, and determining, according to the identifier or address of the anchor SMF, that the anchor SMF of the first PDU session is not in the current PLMN; or if the first PDU session is a home routed PDU session and the UE is in the VPLMN, then determining that the anchor SMF of the first PDU session is not in the current PLMN.

Optionally, determining the V-SMF for the first PDU session includes: selecting the V-SMF based on one or a combination of the following information: Single Network Slice Selection Assistance Information (S-NSSAI) of the first PDU session; a Data Network Name (DNN) of the first PDU session; an anchor SMF of the first PDU session.

Optionally, updating the first PDN session by using the V-SMF includes: sending, to the V-SMF, a request for creating a Session Management (SM) context, so that the V-SMF sends, to an anchor SMF of the first PDU session, a request for updating the SM context.

Optionally, updating the first PDN session by using the V-SMF includes: sending, to an existing V-SMF in a context of the UE, a request for releasing the SM context, wherein the existing V-SMF is a default V-SMF.

Optionally, determining that the UE has the second PDU session of which the SMF is in the current PLMN includes: obtaining an identifier or address of the anchor SMF of the second PDU session, and determining, according to the identifier or address of the anchor SMF, that the anchor SMF of the second PDU session is in the current PLMN; or if the second PDU session is a home routed PDU session and the UE is in the Home Public Land Mobile Network (HPLMN), determining that the anchor SMF is in the current PLMN.

Optionally, updating the second PDU session includes: sending, to the anchor SMF of the second PDU session, a request for updating a Session Management (SM) context.

In a second aspect, the present disclosure provides a network-side device. The network-side device includes a determining module, configured for after a User Equipment (UE) moves across Public Land Mobile Networks (PLMN) or across systems, determining that the UE has a first PDU session of which an anchor SMF is not in a current PLMN; an updating module, configured for determining a Session Management Function V-SMF in a Visited Public Land Mobile Network (VPLMN) for the first PDU session, and updating the first PDN session by using the V-SMF.

Optionally, the determining module is further configured for determining that the UE has a second PDU session of which the anchor SMF is in the current PLMN; the updating module is further configured for updating the second PDU session.

Optionally, the network-side device further includes a judging module. The judging module is configured for receiving a registration request of the UE, wherein the registration request carries temporary identifier information of the UE; and judging, according to the temporary identifier information, whether the UE moves across PLMNs or across systems; wherein the temporary identifier information is a Global Unique Temporary Identifier (GUTI) of the UE.

Optionally, the judging module is specifically configured for: when the GUTI is a 5G GUTI and a mobile country code (MCC) and a mobile network code (MNC) in the GUT1 are different from those in the current PLMN, determining that the UE moves across PLMNs.

Optionally, the judging module is specifically configured for: when the GUTI is a Mapped 5G GUTI, determining that the UE moves across systems.

Optionally, the determining module is specifically configured for: obtaining an identifier or address of the anchor SMF of the first PDU session, and determining, according to the identifier or address of the anchor SMF, that the anchor SMF of the first PDU session is not in the current PLMN; or if the first PDU session is a home routed PDU session and the UE is in the VPLMN, then determining that the anchor SMF of the first PDU session is not in the current PLMN.

Optionally, the updating module is specifically configured for: selecting the V-SMF based on one or a combination of the following information: Single Network Slice Selection Assistance Information (S-NSSAI) of the first PDU session; a Data Network Name (DNN) of the first PDU session; an anchor SMF of the first PDU session.

Optionally, the updating module is specifically configured for: sending, to the V-SMF, a request for creating a Session Management (SM) context, so that the V-SMF sends, to an anchor SMF of the first PDU session, a request for updating the SM context.

Optionally, the updating module is specifically configured for: sending, to an existing V-SMF in a context of the UE, a request for releasing the SM context, wherein the existing V-SMF is a default V-SMF.

Optionally, the determining module is specifically configured for: obtaining an identifier or address of the anchor SMF of the second PDU session, and determining, according to the identifier or address of the anchor SMF, that the anchor SMF of the second PDU session is in the current PLMN; or if the second PDU session is a home routed PDU session and the UE is in the Home Public Land Mobile Network (HPLMN), determining that the anchor SMF is in the current PLMN.

Optionally, the updating module is specifically configured for: sending, to the anchor SMF of the second PDU session, a request for updating a Session Management (SM) context.

In a third aspect, the present disclosure provides a network-side device. The network-side device includes: a storage, a processor, a transceiver, and a computer program stored on the storage and executable by the processor, wherein, when the processor executes the computer program, the processor implements following steps: after a User Equipment (UE) moves across Public Land Mobile Networks (PLMN) or across systems, determining that the UE has a first PDU session of which an anchor SMF is not in a current PLMN; determining a Session Management Function V-SMF in a Visited Public Land Mobile Network (VPLMN) for the first PDU session, and updating the first PDN session by using the V-SMF.

Optionally, when the processor executes the computer program, the processor further implements the following step: determining that the UE has a second PDU session of which the SMF is in the current PLMN, updating the second PDU session.

Optionally, the transceiver is configured for receiving a registration request of the UE, wherein the registration request carries temporary identifier information of the UE; when the processor executes the computer program, the processor further implements the following step: judging, according to the temporary identifier information, whether the UE moves across PLMNs or across systems; wherein the temporary identifier information is a Global Unique Temporary Identifier (GUTI) of the UE.

Optionally, when the processor executes the computer program, the processor further implements the following step: when the GUTI is a 5G GUTI and a mobile country code (MCC) and a mobile network code (MNC) in the GUT1 are different from those in the current PLMN, determining that the UE moves across PLMNs.

Optionally, when the processor executes the computer program, the processor further implements the following step: when the GUTI is a Mapped 5G GUTI, determining that the UE moves across systems.

Optionally, when the processor executes the computer program, the processor further implements the following steps: obtaining an identifier or address of the anchor SMF of the first PDU session, and determining, according to the identifier or address of the anchor SMF, that the anchor SMF of the first PDU session is not in the current PLMN; or if the first PDU session is a home routed PDU session and the UE is in the VPLMN, then determining that the anchor SMF of the first PDU session is not in the current PLMN.

Optionally, when the processor executes the computer program, the processor further implements the following step: selecting the V-SMF based on one or a combination of the following information: Single Network Slice Selection Assistance Information (S-NSSAI) of the first PDU session; a Data Network Name (DNN) of the first PDU session; an anchor SMF of the first PDU session.

Optionally, the transceiver is further configured for: sending, to the V-SMF, a request for creating a Session Management (SM) context, so that the V-SMF sends, to an anchor SMF of the first PDU session, a request for updating the SM context.

Optionally, the transceiver is further configured for: sending, to an existing V-SMF in a context of the UE, a request for releasing the SM context, wherein the existing V-SMF is a default V-SMF.

Optionally, when the processor executes the computer program, the processor further implements the following step: obtaining an identifier or address of the anchor SMF of the second PDU session, and determining, according to the identifier or address of the anchor SMF, that the anchor SMF of the second PDU session is in the current PLMN; or if the second PDU session is a home routed PDU session and the UE is in the Home Public Land Mobile Network (HPLMN), determining that the anchor SMF is in the current PLMN.

Optionally, the transceiver is further configured for: sending, to the anchor SMF of the second PDU session, a request for updating a Session Management (SM) context.

In a fourth aspect, the present disclosure further provides a computer-readable storage medium configured for storing a computer program, wherein, when the computer program is executed by a processor, the processor implements steps in the method of updating a PDU session.

Advantageous effects of the above technical solutions of the present disclosure are as follow: in the embodiments of the present disclosure, the PDU session may be served by an appropriate V-SMF by updating the PDU session. In this way, it may be avoided that, after the UE moves across networks, the AMF of the current PLMN cannot recover a path for the PDU session; and when the UE moves across systems, the PDU session is guaranteed to access a correct network slice and the AMF of the current PLMN is prevented from initiating an unnecessary signaling.

DETAILED DESCRIPTION

Specific embodiments of the present disclosure will be described in further detail below with reference to the accompanying drawings and embodiments. The following embodiments are provided to illustrate the present disclosure, but are not intended to limit the scope of the present disclosure.

Figure 1:
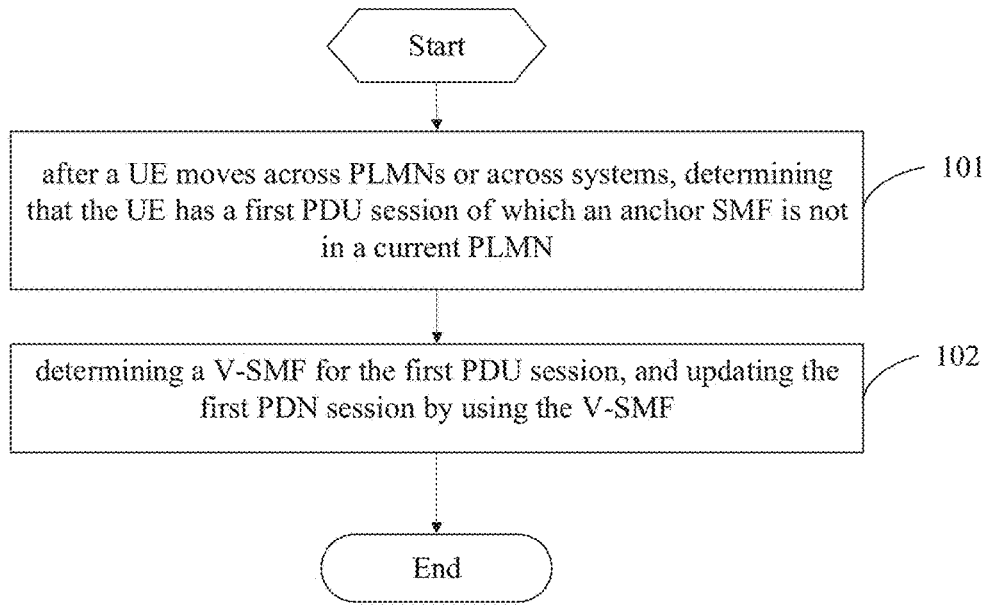
FIG. 1 is a flowchart of a method of updating a PDU session according to some embodiments of the present disclosure.

Referring to FIG. 1, FIG. 1 is a flowchart of a method of updating a PDU session provided in some embodiments of the present disclosure. As shown in FIG. 1, the method of updating a PDU session is applied to a network-side device, and includes following steps 101-102.

Step 101: after a User Equipment (UE) moves across PLMNs or systems, determining that the UE has a first PDU session of which a PDU session anchor (SMF) is not in a current PLMN.

In this step, after the UE moves across PLMNs or systems, an AMF for the network-side device may determine that the UE has the first PDU session of which the PDU session anchor (SMF) is not in the current PLMN.

In some embodiments of the present disclosure, prior to the step 101, the network-side device may determine that the UE moves across PLMNs or across systems. A manner in which the network-side device determines that the UE moves across PLMNs or across systems may be various. For example, the UE sends indication information to the network-side device when the UE moves across PLMNs or the systems, and the network-side device determines, based on the indication information, that the UE moves across PLMNs or across systems.

The network-side device may also determine, in following manners, that the UE moves across PLMNs or across systems: receiving, by the network-side device, a registration request of the UE, wherein the registration request carries temporary identifier information of the UE; and judging, by the network-side device according to the temporary identifier information, whether the UE moves across PLMNs or across systems.

The temporary identifier information is a Global Unique Temporary Identifier (GUTI) of the UE.

Further, judging, by the network-side device, whether the UE moves across PLMNs or across systems may include following implementations.

First implementation: when the GUTI is a 5G GUTI and a mobile country code (MCC) and a mobile network code (MNC) in the GUT1 are different from those in the current PLMN, determining that the UE moves across PLMNs.

Second implementation: when the GUTI is a Mapped 5G GUTI, determining that the UE moves across systems.

In the embodiments of the present disclosure, moving across PLMNs by the UE may include, but is not limited to, following situations: moving from a HPLMN to a VPLMN by the UE; moving from the VPLMN to the HPLMN by the UE; moving from an original VPLMN to the present VPLMN.

Moving across systems by the UE may include, but is not limited to: moving from EPS to 5GS by the UE.

In the embodiments of the present disclosure, determining, by the network-side device, that the UE has the first PDU session of which the PDU session anchor (SMF) is not in the current PLMN, may include, but is not limited to, following two implementations.

First implementations: obtaining an identifier or address of the PDU session anchor (SMF) of the first PDU session by a network-side device, and determining, according to the identifier or address of the PDU session anchor (SMF) that the PDU session anchor (SMF) of the first PDU session is not in the current PLMN.

Second implementation: if the first PDU session is a home routed PDU session and the UE is in the VPLMN, then determining, by the network-side device, that the PDU session anchor (SMF) of the first PDU session is not in the current PLMN.

It should be noted that the t UE is currently not in the HPLMN, and subscription information of a DNN used by the PDU session indicates that a local breakout can not be used, then the network-side device may determine that this PDU session is a home routed PDU session.

Step 102: determining a V-SMF for the first PDU session, and updating the first PDN session by using the V-SMF.

In this step, the network-side device determines a V-SMF for the first PDU session, and updates the first PDN session by using the V-SMF.

Determining the V-SMF for the first PDU session by the network-side device may be implemented by following implementation: selecting the V-SMF by the network-side device based on one or a combination of following information: Single Network Slice Selection Assistance Information (S-NSSAI) of the first PDU session; a Data Network Name (DNN) of the first PDU session; a PDU session anchor (SMF) of the first PDU session.

Updating the first PDU session by the network-side device by using the V-SMF may be implemented by the following implementations: sending, by the network-side device to the V-SMF, a request for creating an SM context, so that the V-SMF sends, to a PDU session anchor (SMF) of the first PDU session, a request for updating the SM context.

It should be noted that, after the UE moves across PLMNs, if the AMF in the original PLMN finds that a V-SMF exists for the PDU session of the UE, then the AMF needs to send, to the V-SMF, a request for releasing the SM context.

In the case that the UE moves across systems, updating the first PDU session by the network-side device by using the V-SMF, may further include the following implementations: sending, by the network-side device to an existing V-SMF in the context of the UE, a request for releasing the SM context, wherein the existing V-SMF is a default V-SMF.

In the embodiments of the present disclosure, the network-side device not only determines that the UE has the first PDU session of which the PDU session anchor (SMF) is not in the current PLMN, but also determines that the UE has a second PDU session of which the SMF is in the current PLMN, and the network-side device updates not only the first PDU session but also the second PDU session.

Determining, by the network-side device, that the UE has the second PDU session of which the PDU session anchor (SMF) is in the current PLMN may include, but not limited to, the following two implementations:

First implementation: obtaining an identifier or address of the PDU session anchor (SMF) of the second PDU session, and determining, according to the identifier or address of the PDU session anchor (SMF), that the PDU session anchor (SMF) of the second PDU session is in the current PLMN.

Second implementation: if the second PDU session is a home routed PDU session and the UE is in the Home Public Land Mobile Network (HPLMN), determining that the PDU session anchor (SMF) is in the current PLMN.

Updating the second PDU session by the network-side device may include, but is not limited to, the following implementation: sending, to the PDU session anchor (SMF) of the second PDU session, a request for updating the SM context.

In the embodiments of the present disclosure, updating the PDU session by the network-side device by using the V-SMF, may include various ways such as inserting a V-SMF, changing a V-SMF or deleting a V-SMF.

In order to facilitate understanding of various embodiments of the present disclosure, several scenarios in which the UE moves across PLMNs or systems are respectively illustrated below by way of examples.

First Embodiment

Figure 2:
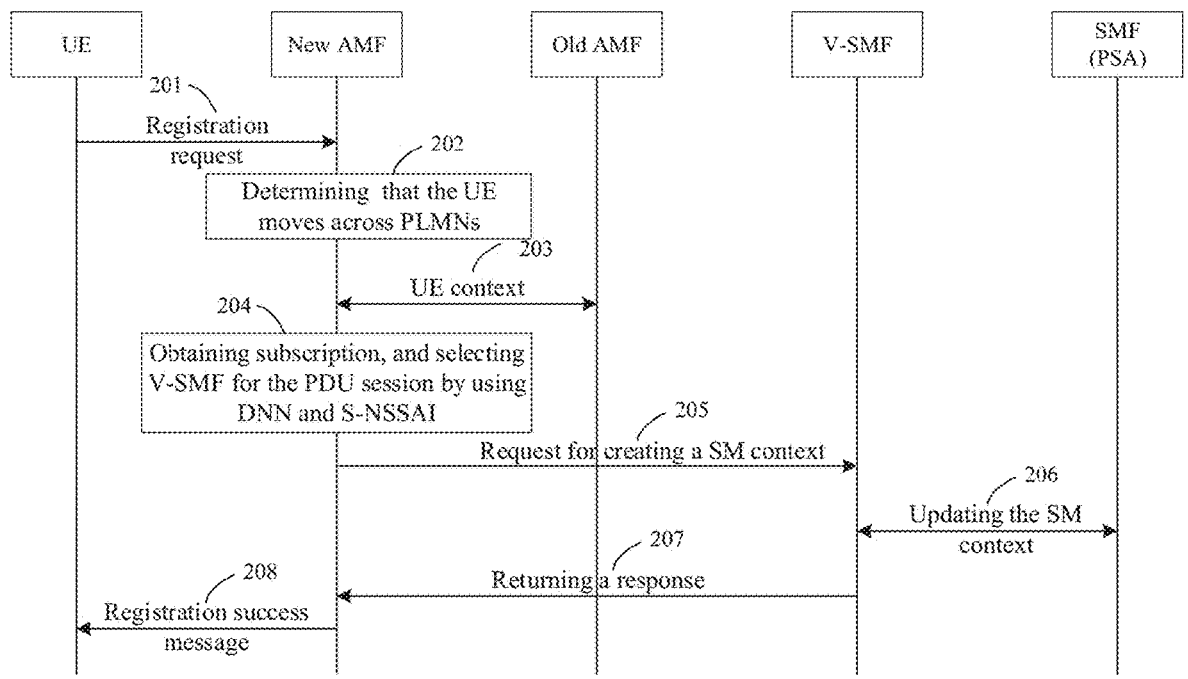
FIG. 2 is another flowchart of a method of updating a PDU session according to some embodiments of the present disclosure.

As shown in FIG. 2, a method of updating a PDU session includes following steps 201-208.

Step 201: sending a registration request by the UE as a result of movement from a HPLMN to a VPLMN.

Step 202: receiving the request from the UE by a New AMF in the VPLMN, and determining, by the New AMF according to an old GUTI (which is a 5G GUTI) in the request, that the UE has moved across PLMNs. Specifically, according to a condition that the MCC (mobile country code) and MNC (Mobile Network Code) in the old GUTI are different from the MCC and the MNC of the present PLMN ID, it is determined that the UE has moved across PLMNs.

Step 203: obtaining a context of the UE by the New AMF from an old AMF indicated by the old GUTI, wherein the UE context includes all PDU session information.

Step 204: obtaining relevant information of a PDU session by the New AMF, wherein the relevant information of the PDU session includes a DNN being used, whether the DNN allows use of LBO, a S-NSSAI being used, a PDU session anchor (SMF), etc.; and selecting a V-SMF for a PDU session (e.g., a home-routed PDU session) of which the PDU session anchor (SMF) is not in the current PLMN.

Step 205: sending a request for creating a SM context to the newly selected V-SMF by the New AMF, wherein the request carries information of the PDU session anchor (SMF).

Step 206: requesting the V-SMF to create a context for a PDU session of the UE, and updating the PDU session with the PDU session anchor (SMF).

Step 207: updating the PDU session with the PDU session anchor (SMF) by the V-SMF according to the information provided by the AMF.

Step 208: after the updating is completed, returning a response to the AMF by the V-SMF, and then returning a registration success message to the UE by the AMF.

Second Embodiment

Figure 3:
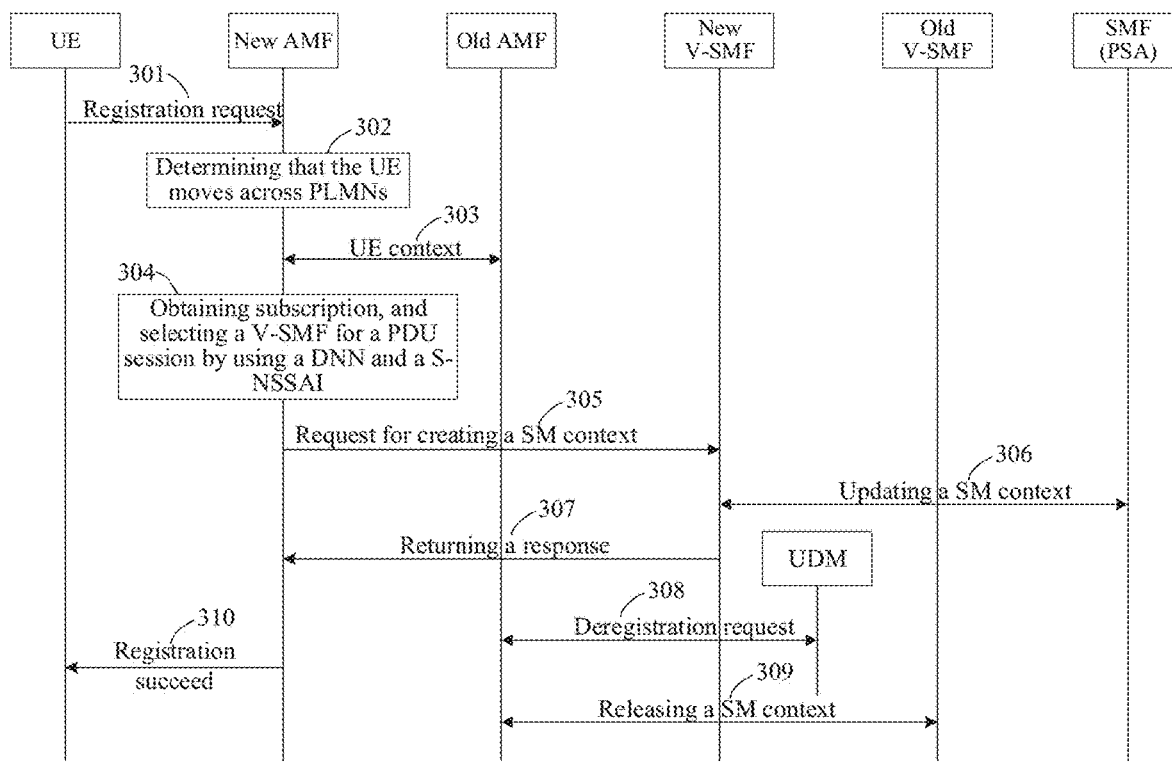
FIG. 3 is another flowchart of a method of updating a PDU session according to some embodiments of the present disclosure.

As shown in FIG. 3, a method of updating a PDU session includes following steps 301-310.

Step 301: Sending a registration request by the UE as a result of movement from a VPLMN moving from one VPLMN to another VPLMN.

Step 302: receiving the request from the UE by a new AMF in the new VPLMN, and determining, according to the old GUTI (which is a 5G GUTI) in the request, that the UE has moved across PLMNs. Specifically, according to a condition that the MCC (mobile country code) and the MNC (Mobile Network Code) in the old GUTI are different from the MCC and the MNC of the present PLMN ID, it is determined that the UE has moved across PLMNs.

Step 303: obtaining a context of the UE by the New AMF from an old AMF indicated by the old GUTI, wherein the UE context includes an identifier of the UE and all PDU session information.

Step 304: according to the old GUTI and Subscription Permanent Identity (SUPI) of the UE (the MCC and the MNC in the old GUTI are different from those in the SUPI), determining, by the New AMF, that the UE previously resided in the VPLMN; in such a case, if a V-SMF is present in a PDU session context of the UE, sending, by the new AMF to an old AMF, an indication indicating that the V-SMF serving the PDU session of the UE has changed; wherein if a V-SMF is not present in the PDU session context of the UE, no indication for the PDU is sent.

Step 305: obtaining relevant information of a PDU session by the New AMF, wherein the relevant information of the PDU session includes a DNN being used, whether the DNN allows use of LBO, a S-NSSAI being used, V-SMF being used, a PDU session anchor (SMF) being used, etc.; and selecting a V-SMF for a PDU session (e.g., a home-routed PDU session) of which the PDU session anchor is not in the current PLMN; for a PDU session of which a PDU session anchor is in the present PLMN (for a scenario where a PDU session has been established using a LBO approach in the current VPLMN), directly invoking a SM context service of the PDU session anchor (SMF) to update the PDU session to the PDU session anchor (SMF)

Step 306: sending a request for creating a SM context to the newly selected V-SMF by the New AMF, wherein the request carries information of the PDU session anchor (SMF); and requesting the V-SMF to create a context for the PDU session of the UE, and updating the PDU session with the PDU session anchor (SMF).

Step 307: updating the PDU session with the anchor (SMF) by the V-SMF according to the information provided by the AMF.

Step 308: after the updating is completed, returning a response to the AMF by the V-SMF, and then returning a registration success message to the UE by the AMF.

Step 309: after receiving a deregistration request sent by the UDM, further determining, by the old AMF according to an indication of change of the V-SMF of a PDU session received from the new AMF, deletion of the V-SMF previously serving the PDU session of the UE.

Step 310: calling release of a SM Context service to each Old V-SMF serving the UE, to request the Old V-SMF to locally delete a relevant PDU session of the UE.

Third Embodiment

Figure 4:
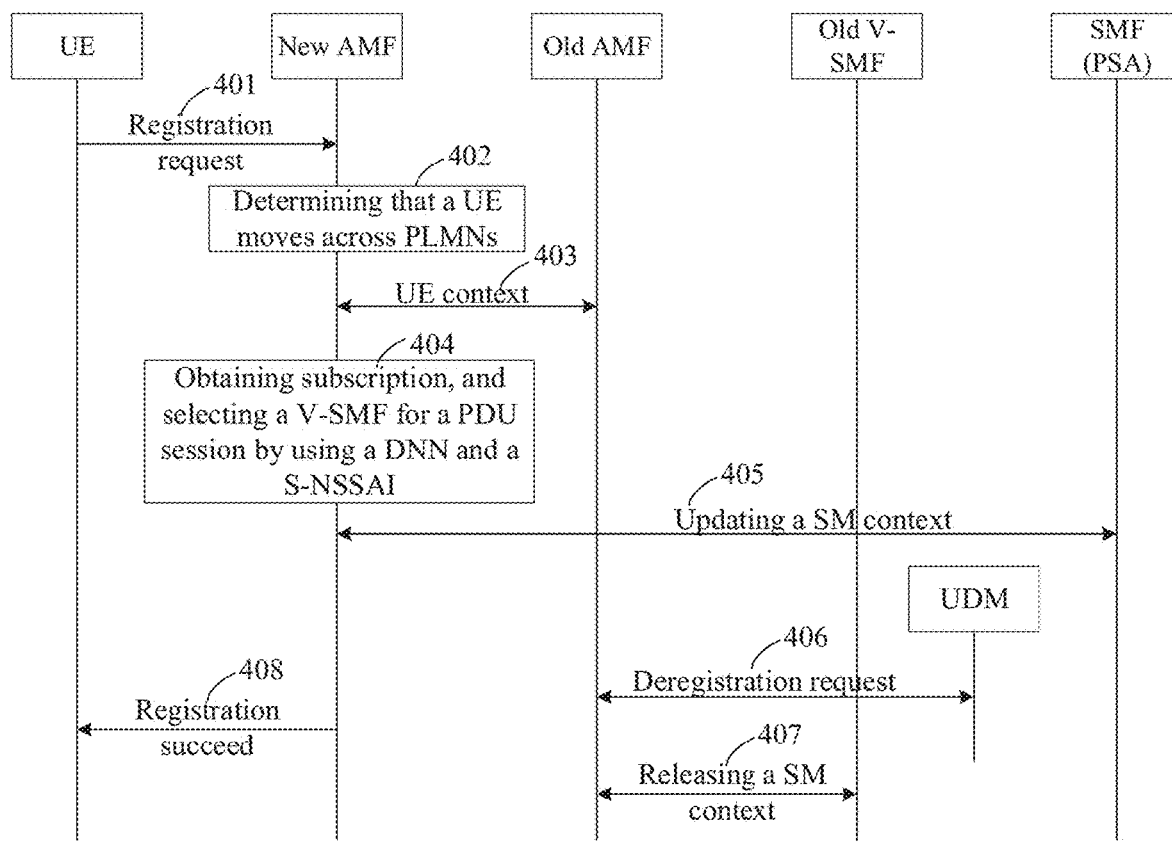
FIG. 4 is another flowchart of a method of updating a PDU session according to some embodiments of the present disclosure.
Figure 5:
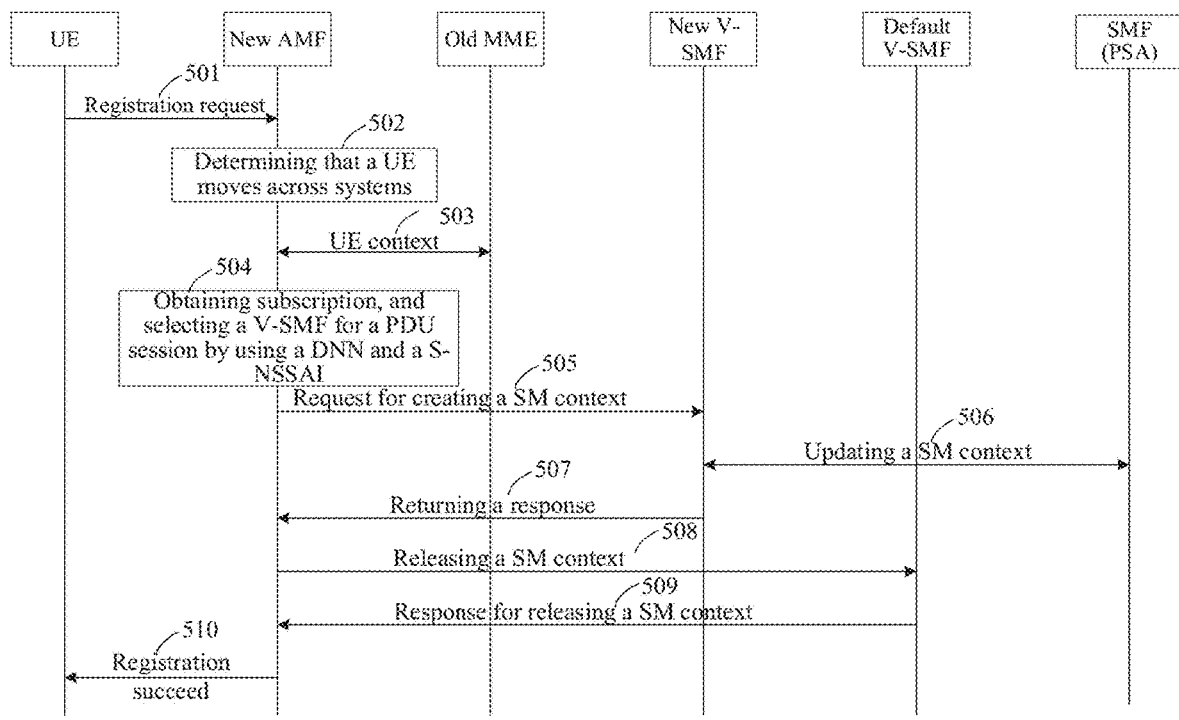
FIG. 5 is another flowchart of a method of updating a PDU session according to some embodiments of the present disclosure.

As shown in FIG. 4, a method of updating a PDU session includes the following steps 401-408.

Step 401: sending a registration request by the UE as a result of movement from a VPLMN to a HPLMN Step 402: receiving the request from the UE by a New AMF in the HPLMN, and determining, by the New AMF according to an old GUTI (which is a 5G GUTI) in the request, that the UE has moved across PLMNs. Specifically, according to a condition that the MCC and the MNC in the old GUTI are different from the MCC and the MNC of the present PLMN ID, it is determined that the UE has moved across PLMNs.

Step 403: obtaining a context of the UE by the New AMF from an old AMF indicated by the old GUTI, wherein the UE context includes an identifier of the UE and all PDU session information; according to the old GUTI and the SUPI of the UE (the MCC and the MNC in the old GUTI are different from those in the SUPI), determining, by the New AMF, that the UE previously resided in a different PLMN; in such a case, sending, by the New AMF to an old AMF, an indication indicating that the V-SMF serving the UE has changed.

Step 404: obtaining relevant information of a PDU session by the New AMF, wherein the relevant information of the PDU session includes a DNN being used, whether the DNN allows use of LBO, a S-NSSAI being used, V-SMF being used, an anchor (SMF) being used, etc.

Step 405: determining, by the New AMF according to the SUPI of the UE, that the current PLMN is the HPLMN of the UE. Therefore, for a home-routed PDU session, an updating SM Context service of the PDU session anchor (SMF) is directly invoked to update the PDU session with the PDU session anchor (SMF).

Step 406: after the updating is completed, returning a registration success message to the UE by the AMF.

Step 407: after receiving a deregistration request sent by the UDM, further determining, by the old AMF according to an indication of change of the V-SMF received from the new AMF, deletion of the V-SMF previously serving the home-routed PDU session of the UE Step 408: calling release of a SM Context service to each Old V-SMF serving the UE, to request the Old V-SMF to locally delete a relevant PDU session of the UE.

It should be noted that, the above methods are equally applicable to a case in which a PDU session is established by a UE in any PLMN, and then a PDU session update occurs after the UE moves across PLMNs, by replacing the HPLMN in the first embodiment or the second embodiment with the PLMN where the PDU session anchor is located at the time of establishing the PDU session by the UE.

Fourth Embodiment

Step 501: after a UE in a connected state moves across systems (from an EPS to a 5GS), initiating a connected-state registration process by the UE, wherein a mapped 5G GUTI mapped from a 4G GUTI is carried in the old GUTI of a registration request of the UE.

Step 502: receiving the request of the UE by the New AMF, and determining, by the New AMF according to the old GUTI (which is the mapped 5G GUTI) in the request, that the UE has moved across systems. Specifically, the New AMF may determine, according to an indication of a GUTI type, that the UE has moved across systems.

Step 503: obtaining a context of the UE by the New AMF from an old MME indicated by the old GUTI.

Step 504: obtaining subscription information of the UE from the UDM by the New AMF.

Step 505: If the AMF uses a default V-SMF in a previous cross-system movement process to re-establish a home-routed PDU session for the UE in the 5GS, needing to re-select a V-SFM for the PDU session by the AMF according to information such as the DNN of the PDU session and the S-NSSAI, wherein the S-NSSAI of the PDU session is carried in the registration request of the UE or obtained from the subscription information of the UE.

Step 506: sending, by the New AMF to the newly selected V-SMF, a request of creating a SM Context, where the request carries information of the PDU session anchor (SMF) to request the V-SMF to create a context for the PDU session of the UE, and updating a PDU session with the PDU session anchor (SMF).

Step 507: updating the PDU session with the PDU session anchor (SMF) by the V-SMF according to the information provided by the AMF.

Step 508: after the updating is completed, returning a response to the AMF by the V-SMF.

Step 509: calling release of a SM Context service to an original default V-SMF by the AMF for the PDU session with which a V-SMF is updated, to locally delete information of the PDU session on the default V-SMF.

Step 510: returning a registration success message to the UE by the AMF.

In some embodiments of the present disclosure, the PDU session may be served by an appropriate V-SMF by updating the PDU session. In this way, it may be avoided that, after the UE moves across networks, the AMF of the current PLMN cannot recover a path for the PDU session; and when the UE moves across systems, the PDU session is guaranteed to access a correct network slice and the AMF of the current PLMN is prevented from initiating an unnecessary signaling.

Figure 6:
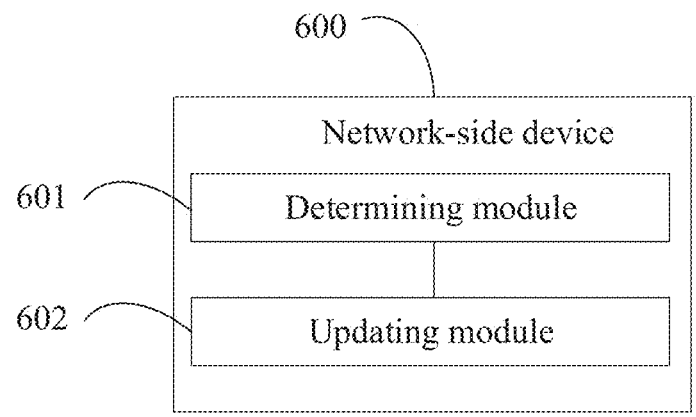
FIG. 6 is a structural diagram of a network-side device according to some embodiments of the present disclosure.

Referring to FIG. 6, FIG. 6 is a structural schematic diagram of a network-side device provided in some embodiments of the present disclosure, as shown in FIG. 6. The network-side device 600 includes: a determining module 601 and a updating module 602.

The determining module 601 is configured for: after a User Equipment (UE) moves across Public Land Mobile Networks (PLMN) or across systems, determining that the UE has a first PDU session of which a PDU session anchor (SMF) is not in a current PLMN.

The updating module 602 is configured for determining a Session Management Function (V-SMF) in a Visited Public Land Mobile Network (V-PLMN) for the first PDU session, and updating the first PDN session by using the V-SMF.

Optionally, the determining module 601 is further configured for: determining that the UE has a second PDU session of which the PDU session anchor (SMF) is in the current PLMN.

The updating module 602 is further configured for updating the second PDU session.

Figure 7:
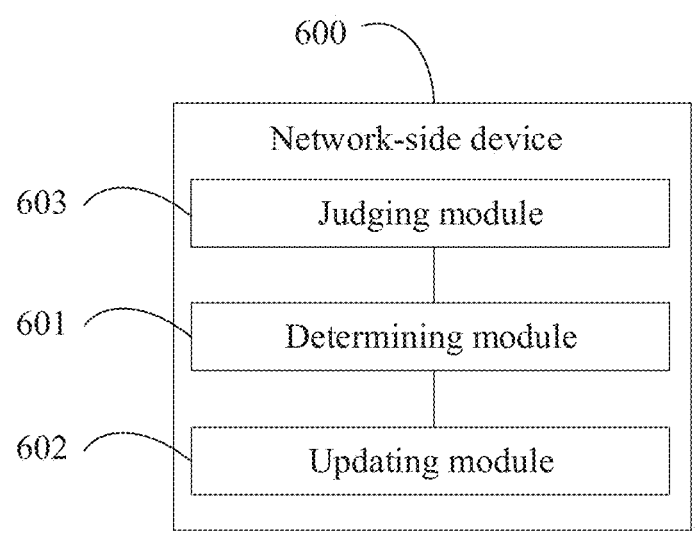
FIG. 7 is another structural diagram of a network-side device according to some embodiments of the present disclosure.

Optionally, as shown in FIG. 7, the network-side device 600 further includes a judging module 603 configured for: receiving a registration request of the UE, wherein the registration request carries temporary identifier information of the UE; and judging, according to the temporary identifier information, whether the UE moves across PLMNs or across systems; wherein the temporary identifier information is a Global Unique Temporary Identifier (GUTI) of the UE.

Optionally, the judging module 603 is specifically configured for: when the GUTI is a 5G GUTI and a mobile country code (MCC) and a mobile network code (MNC) in the GUT1 are different from those in the current PLMN, determining that the UE moves across PLMNs.

Optionally, the judging module 603 is specifically configured for: when the GUTI is a Mapped 5G GUTI, determining that the UE moves across systems.

Optionally, the determining module 601 is specifically configured for: obtaining an identifier or address of the PDU session anchor (SMF) of the first PDU session, and determining, according to the identifier or address of the PDU session anchor (SMF) that the PDU session anchor (SMF) of the first PDU session is not in the current PLMN, or if the first PDU session is a home routed PDU session and the UE is in the VPLMN, then determining that the PDU session anchor (SMF) of the first PDU session is not in the current PLMN.

Optionally, the updating module 602 is specifically configured for: selecting the V-SMF based on one or a combination of the following information: S-NSSAI of the first PDU session; the DNN of the first PDU session; a PDU session anchor (SMF) of the first PDU session.

Optionally, the updating module 602 is specifically configured for: sending, to the V-SMF, a request for creating an SM context, so that the V-SMF sends, to a PDU session anchor (SMF) of the first PDU session, a request for updating the SM context.

Optionally, the updating module 602 is specifically configured for: sending, to a V-SMF existing in the context of the UE, a request for releasing the SM context, wherein the existing V-SMF is a default V-SMF.

Optionally, the determining module 601 is specifically configured for: obtaining an identifier or address of the PDU session anchor (SMF) of the second PDU session, and determining, according to the identifier or address of the PDU session anchor (SMF), that the PDU session anchor (SMF) of the second PDU session is in the current PLMN, or if the second PDU session is a home routed PDU session and the UE is in the Home Public Land Mobile Network (HPLMN), determining that the PDU session anchor (SMF) is in the current PLMN.

Optionally, the updating module 602 is specifically configured for: sending, to the PDU session anchor (SMF) of the second PDU session, a request for updating the SM context.

It should be noted that, in this embodiment, the above-mentioned network-side device 600 may be a network-side device in any of the method embodiments of the present disclosure, any implementation of the network-side device in the method embodiments of the present disclosure can be implemented by the above-mentioned network-side device 600 in this embodiment, and achieve the same beneficial effect, which is not repeated here.

Figure 8:
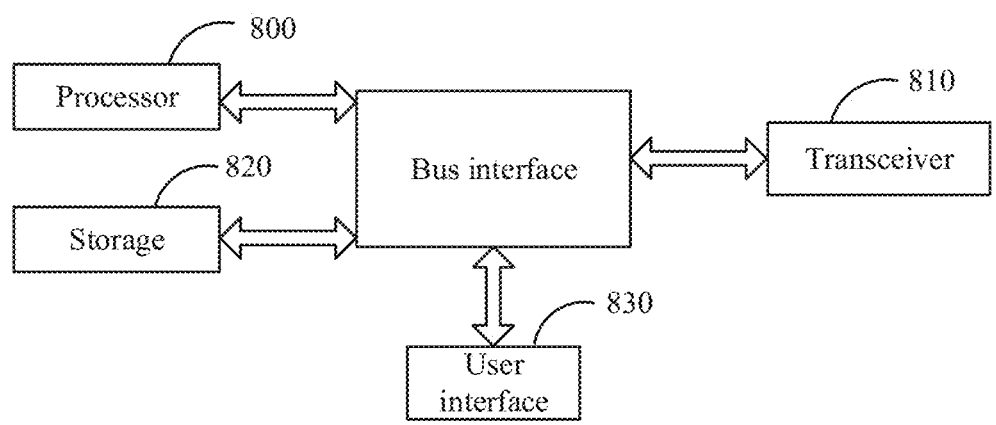
FIG. 8 is another structural diagram of a network-side device according to some embodiments of the present disclosure.

Referring to FIG. 8, FIG. 8 is another structural schematic diagram of a network-side device provided in the embodiments of the present disclosure, as shown in FIG. 8, the network-side device includes a processor 800, a transceiver 810, a storage 820, a user interface 830, and a bus interface, wherein: the processor 800 is configured for reading a program in the storage 820, and performing following processes: after a User Equipment (UE) moves across Public Land Mobile Networks (PLMNs) or systems, determining that the UE has a first PDU session of which a PDU session anchor (SMF) is not in a current PLMN; determining a Session Management Function (V-SMF) in a Visited Public Land Mobile Network (VPLMN) for the first PDU session, and updating the first PDN session by using the V-SMF In FIG. 8, a bus architecture may include any number of interconnected buses and bridges, specifically various circuits such as one or more processors represented by the processor 800 and storages represented by the storage 820 are linked together. The bus architecture may also link together various other circuits such as peripheral devices, voltage regulators, power management circuits, and the like, which are well known in the art and therefore will not be further described herein. The bus interface provides an interface. The transceiver 810 may be a plurality of elements, i.e., including a transmitter and a receiver, for providing a means for communicating with various other devices over a transmission medium. For different terminals, the user interface 830 may also be an interface capable of externally or internally connecting necessary devices, and the connected devices include but are not limited to a keypad, a display, a speaker, a microphone, a joystick, etc.

The processor 800 is responsible for managing the bus architecture and general processing, and the storage 820 may store data used by the processor 800 when performing operations.

Optionally, the processor 800 also implements the following steps when executing the computer program: determining that the UE has a second PDU session of which the SMF is in the current PLMN, and updating the second PDU session.

Optionally, the transceiver 810 is configured for: receiving a registration request of the UE, wherein the registration request carries temporary identifier information of the UE.

The processor 800 implements following steps when executing the computer program: judging, according to the temporary identifier information, whether the UE moves across PLMNs or across systems, wherein, the temporary identifier information is a Global Unique Temporary Identifier (GUTI) of the UE.

Optionally, the processor 800 implements following steps when executing the computer program: when the GUTI is a 5G GUTI and a mobile country code (MCC) and a mobile network code (MNC) in the GUT1 are different from those in the current PLMN, determining that the UE moves across PLMNs.

Optionally, the processor 800 implements following steps when executing the computer program: when the GUTI is a Mapped 5G GUTI, determining that the UE moves across systems.

Optionally, the processor 800 implements following steps when executing the computer program: obtaining an identifier or address of the PDU session anchor (SMF) of the first PDU session, and determining, according to the identifier or address of the PDU session anchor (SMF), that the PDU session anchor (SMF) of the first PDU session is not in the current PLMN; or if the first PDU session is a home routed PDU session and the UE is in the VPLMN, then determining that the PDU session anchor (SMF) of the first PDU session is not in the current PLMN.

Optionally, the processor 800 implements following steps when executing the computer program: selecting the V-SMF based on one or a combination of the following information: S-NSSAI of the first PDU session; the DNN of the first PDU session; the PDU session anchor (SMF) of the first PDU session.

Optionally, the transceiver 810 is further configured for: sending, to the V-SMF, a request for creating an SM context, so that the V-SMF sends, to a PDU session anchor (SMF) of the first PDU session, a request for updating the SM context.

Optionally, the transceiver 810 is further configured for: sending, to an existing V-SMF in the context of the UE, a request for releasing the SM context, wherein the existing V-SMF is a default V-SMF.

Optionally, the processor 800 implements following steps when executing the computer program: obtaining an identifier or address of the PDU session anchor (SMF) of the second PDU session, and determining, according to the identifier or address of the PDU session anchor (SMF), that the PDU session anchor (SMF) of the second PDU session is in the current PLMN, or if the second PDU session is a home routed PDU session and the UE is in the Home Public Land Mobile Network (HPLMN), determining that the PDU session anchor (SMF) is in the current PLMN.

Optionally, the transceiver 810 is further configured for: sending, to the PDU session anchor (SMF) of the second PDU session, a request for updating the SM context.

In the embodiments of the present disclosure, the device includes a network-side device (i.e. base station) and a UE (i.e. mobile communication terminal), and downlink transmission and uplink reception can be performed between the network-side device and the UE.

The base station may be a base station or other type of transmission point device in the related art, and the terminal may be a user equipment. Of course, the present disclosure is not limited to the above two devices, for example, the base station may also be a terminal capable of performing a configuration operation on other terminals. It may also be considered that a base station contains a plurality of network sites. The network node may include only a radio frequency (such as a Remote Radio Unit (RRU, for short)) or two parts including a baseband and radio frequency, such as an Active Antenna. The network node may include only a baseband (such as a Baseband Unit (BBU)), or may not include any digital/radio-frequency function of an air-interface layer at all, but is only responsible for high-level signal processing. A baseband processing of the air-interface layer is putted to an active antenna. There are also a number of other network implementation possibilities.

The mobile communication terminal may also be referred to as a User Equipment (UE), or may be called a Terminal, a Mobile Station (MS), a Mobile Terminal, etc. The terminal may communicate with one or more core networks via a Radio Access Network (RAN), for example, the mobile communication terminal may be a mobile phone (or referred to as a "cellular" phone), a computer with a mobile terminal, or the like, for example, The mobile communication terminal may also be a portable mobile device, a pocket-sized mobile device, a hand-held mobile device, a computer-built in mobile device or a vehicle-mounted mobile device that exchanges voice and/or data with the radio access network. The mobile communication terminal in the embodiments of the present disclosure may also be a Device to device (D2D) terminal or a Machine to Machine (M2M) terminal. The base station and the mobile communication terminal are not particularly limited in the embodiments of the present disclosure.

The embodiments of the present disclosure also provide a computer readable storage medium having a computer program stored thereon, wherein the computer program, when executed by the processor, may implement the steps in the method applied to the mobile communication terminal provided by the embodiments of the present disclosure.

Those of ordinary skill in the art will appreciate that units and algorithm steps of the examples described in connection with the embodiments disclosed herein can be implemented in electronic hardware, or a combination of computer software and electronic hardware. Whether these functions are performed in hardware or software depends on specific application and design constraints of the technical solutions. Those skilled in the art may use different methods to implement the described functionality for each particular application, but such implementations should not be considered to go beyond the protection scope of the present disclosure.

It will be apparent to those skilled in the art that for convenience and brevity of description, specific operating procedures of systems, devices, and units described above may be obtained by referring to corresponding procedures in the foregoing method embodiments, and will not be repeated here.

In the embodiments provided herein, it should be understood that the disclosed apparatus and methods may be implemented in other ways. For example, the device embodiments described above are merely illustrative, e.g., a division of units is only a logical function division, and there may be other division ways when actually implemented, for example, multiple units or components may be combined or may be integrated into another system, or some features may be omitted or not performed. Optionally, coupling or direct coupling or communication connection shown or discussed with respect to each other may be an indirect coupling or communication connection through some interfaces, devices or units, wherein the indirection coupling or communication connections may be in an electrical, mechanical or other form.

Units described as separate components may or may not be physically separated, components shown as units may and may not necessarily be physical units, i.e. may be located in one place, or may be distributed over a plurality of network units. Some or all of the units may be selected according to actual needs to achieve the purpose of the technical solution of the present embodiment.

In addition, each functional unit in various embodiments of the present disclosure may be integrated in one processing unit, or each unit may exist physically alone, or two or more units may be integrally formed in one unit.

The functions, if implemented in the form of software functional units and sold or used as stand-alone products, may be stored in a computer readable storage medium. Based on such an understanding, an essential part or a part contributing to the prior art of technical solutions of the present disclosure may be embodied in the form of a software product. The computer software product is stored in a storage medium and includes instructions for causing a computer device (which may be a personal computer, a server, or a network-side device, etc.) to perform all or a part of the steps of the method described in various embodiments of the present disclosure. The aforementioned storage medium includes a USB disk, a removable hard disk, a Read-Only Memory (ROM), a Random Access Memory (RAM), magnetic disk or an optical disc, and other various media that can store program codes.

Those of ordinary skill in the art can understand that all or part of the flows in the method implementing the above embodiments can be accomplished by controlling related hardware through a computer program. The program may be stored in a computer readable storage medium, and the program, when executed, may include a flow in the method embodiments described above. The storage medium may be a magnetic disk, an optical disc, a ROM, or a RAM.

The foregoing are preferred embodiments of the present disclosure and it should be noted that several modifications and embellishments may be made by those of ordinary skill in the art without departing from the principles of the present disclosure. These modifications and embellishments are also considered to be within the protection scope of the present disclosure.

What is claimed is:

1. A method of updating a Protocol Data Unit (PDU) session, the method being applied to a network-side device, wherein the method comprises:
    during a registration procedure initiated after a User Equipment (UE) moves across Public Land Mobile Networks (PLMN) or across systems, determining that the UE has a first PDU session of which an anchor SMF is not in a current PLMN;
    determining a Session Management Function V-SMF in a Visited Public Land Mobile Network (VPLMN) for the first PDU session, and updating the first PDU session by using the V-SMF,
    wherein the method further comprises:
    receiving a registration request of the UE, wherein the registration request carries temporary identifier information of the UE; and
    judging, according to the temporary identifier information, whether the UE moves across PLMNs or across systems;
    wherein the temporary identifier information is a Global Unique Temporary Identifier (GUTI) of the UE.

2. The method according to claim 1, further comprising:
    determining that the UE has a second PDU session of which the SMF is in the current PLMN, updating the second PDU session.

3. The method according to claim 1, wherein judging, according to the temporary identifier information, whether the UE moves across PLMNs or across systems comprises:
    when the GUTI is a 5G GUTI and a mobile country code (MCC) and a mobile network code (MNC) in the GUT1 are different from those in the current PLMN, determining that the UE moves across PLMNs.

4. The method according to claim 1, wherein judging, according to the temporary identifier information, whether the UE moves across PLMNs or across systems comprises:
    when the GUTI is a Mapped 5G GUTI, determining that the UE moves across systems.

5. The method according to claim 1, wherein determining that the UE has the first PDU session of which the anchor SMF is not in the current PLMN, comprises:
    obtaining an identifier or address of the anchor SMF of the first PDU session, and determining, according to the identifier or address of the anchor SMF, that the anchor SMF of the first PDU session is not in the current PLMN; or
    if the first PDU session is a home routed PDU session and the UE is in the VPLMN, then determining that the anchor SMF of the first PDU session is not in the current PLMN.

6. The method according to claim 1, wherein determining the V-SMF for the first PDU session comprises:
    selecting the V-SMF based on one or a combination of the following information: Single Network Slice Selection Assistance Information (S-NSSAI) of the first PDU session; a Data Network Name (DNN) of the first PDU session; an anchor SMF of the first PDU session.

7. The method according to claim 1, wherein updating the first PDN session by using the V-SMF comprises:
    sending, to the V-SMF, a request for creating a Session Management (SM) context, so that the V-SMF sends, to an anchor SMF of the first PDU session, a request for updating the SM context.

8. The method according to claim 4, wherein updating the first PDN session by using the V-SMF comprises:
    sending, to an existing V-SMF in a context of the UE, a request for releasing the SM context, wherein the existing V-SMF is a default V-SMF.

9. The method according to claim 2, wherein determining that the UE has the second PDU session of which the SMF is in the current PLMN comprises:
    obtaining an identifier or address of the anchor SMF of the second PDU session, and determining, according to the identifier or address of the anchor SMF, that the anchor SMF of the second PDU session is in the current PLMN; or
    if the second PDU session is a home routed PDU session and the UE is in the Home Public Land Mobile Network (HPLMN), determining that the anchor SMF is in the current PLMN; or
    updating the second PDU session comprises sending, to the anchor SMF of the second PDU session, a request for updating a Session Management (SM) context.

10. A network-side device, comprising:
    a storage, a processor, a transceiver, and a computer program stored on the storage and executable by the processor, wherein, when the processor executes the computer program, the processor implements following steps:
    during a registration procedure initiated after a User Equipment (UE) moves across Public Land Mobile Networks (PLMN) or across systems, determining that the UE has a first PDU session of which an anchor SMF is not in a current PLMN;
    determining a Session Management Function V-SMF in a Visited Public Land Mobile Network (VPLMN) for the first PDU session, and updating the first PDN session by using the V-SMF,
    wherein the transceiver is configured for receiving a registration request of the UE, wherein the registration request carries temporary identifier information of the UE;
    when the processor executes the computer program, the processor further implements the following step:
        judging, according to the temporary identifier information, whether the UE moves across PLMNs or across systems;
        wherein the temporary identifier information is a Global Unique Temporary Identifier (GUTI) of the UE.

11. The network-side device according to claim 10, wherein when the processor executes the computer program, the processor further implements the following step:

determining that the UE has a second PDU session of which the SMF is in the current PLMN, updating the second PDU session.

12. The network-side device according to claim 10, wherein when the processor executes the computer program, the processor further implements the following step:

when the GUTI is a 5G GUTI and a mobile country code (MCC) and a mobile network code (MNC) in the GUT1 are different from those in the current PLMN, determining that the UE moves across PLMNs.

13. The network-side device according to claim 10, wherein when the processor executes the computer program, the processor further implements the following step:

when the GUTI is a Mapped 5G GUTI, determining that the UE moves across systems.

14. The network-side device according to claim 10, wherein when the processor executes the computer program, the processor further implements the following steps:

obtaining an identifier or address of the anchor SMF of the first PDU session, and determining, according to the identifier or address of the anchor SMF, that the anchor SMF of the first PDU session is not in the current PLMN; or if the first PDU session is a home routed PDU session and the UE is in the VPLMN, then determining that the anchor SMF of the first PDU session is not in the current PLMN.

15. The network-side device according to claim 10, wherein when the processor executes the computer program, the processor further implements the following step:

selecting the V-SMF based on one or a combination of the following information: Single Network Slice Selection Assistance Information (S-NSSAI) of the first PDU session; a Data Network Name (DNN) of the first PDU session; an anchor SMF of the first PDU session.

16. The network-side device according to claim 10, wherein the transceiver is further configured for:

sending, to the V-SMF, a request for creating a Session Management (SM) context, so that the V-SMF sends, to an anchor SMF of the first PDU session, a request for updating the SM context.

17. The network-side device according to claim 13, wherein the transceiver is further configured for:

sending, to an existing V-SMF in a context of the UE, a request for releasing the SM context, wherein the existing V-SMF is a default V-SMF.

18. The network-side device according to claim 11, wherein when the processor executes the computer program, the processor further implements the following step:

obtaining an identifier or address of the anchor SMF of the second PDU session, and determining, according to the identifier or address of the anchor SMF, that the anchor SMF of the second PDU session is in the current PLMN; or if the second PDU session is a home routed PDU session and the UE is in the Home Public Land Mobile Network (HPLMN), determining that the anchor SMF is in the current PLMN; or the transceiver is further configured for sending, to the anchor SMF of the second PDU session, a request for updating a Session Management (SM) context.

* * * * *